April 24, 1928.

F. WÖMPNER 1,667,449

MAGNIFYING DEVICE FOR SLIDE RULES

Filed Jan. 26, 1927

F. Wömpner
INVENTOR

By: Marks & Clerk
Attys.

Patented Apr. 24, 1928.

1,667,449

UNITED STATES PATENT OFFICE.

FRITZ WÖMPNER, OF GEROLDSGRÜN, NEAR NUREMBERG, GERMANY, ASSIGNOR TO THE FIRM: A. W. FABER, OF STEIN, NEAR NUREMBERG, GERMANY.

MAGNIFYING DEVICE FOR SLIDE RULES.

Application filed January 26, 1927, Serial No. 163,819, and in Germany November 2, 1926.

The known slide rules are frequently provided with magnifying cursors, that is to say with cursors which carry a magnifying glass either directly or indirectly. The indirect connection of the magnifying glass to the cursor has hitherto been effected by means of a holder which is capable of being turned up. This mode of attaching the magnifying glass, however, necessitates only a limited field of view of the slide rule. In the case of direct connection of the magnifying glass to the cursor, a semi-cylindrical lens is cemented to the cursor in such a manner that the hair line of the cursor lies below the middle of the lens. With this arrangement of the lens it is difficult to distinguish the graduations of the scales, more particularly if one comes to a part of the slide rule which is not figured, that is to say it cannot always be determined with certainty over which line of the scale the magnifying glass is situated, even if it is possible to read off accurately the position of the hair line of the cursor with respect to the graduation line of the slide rule. Both methods of attaching the lens have this drawback in common, that at all times only a single line of the graduations of the slide rule is situated below the middle of the magnifying glass and that the adjacent lines of the graduations appear misplaced through the magnifying glass.

The drawbacks attached to the known magnifying cursors are completely avoided by means of the present invention, according to which the magnifying glass in the form of a semi-cylindrical lens slidably mounted on the cursor between guide members thereon so as to be capable of sliding in the longitudinal direction of the slide rule. By this means the whole width of the cursor is made available for reading through the magnifying glass, because every line of the graduations lying below the window of the cursor can be brought into coincidence with the middle of the lens.

Figure 1:
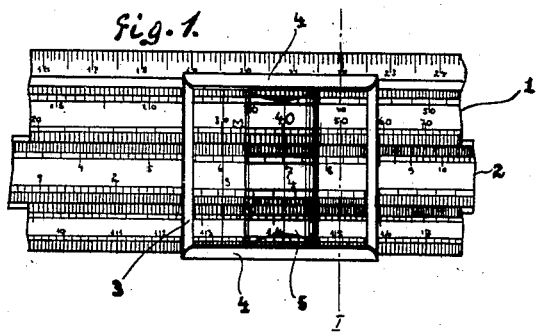
Figure 2:
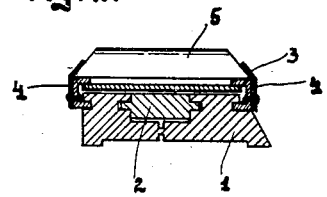
Figure 3:
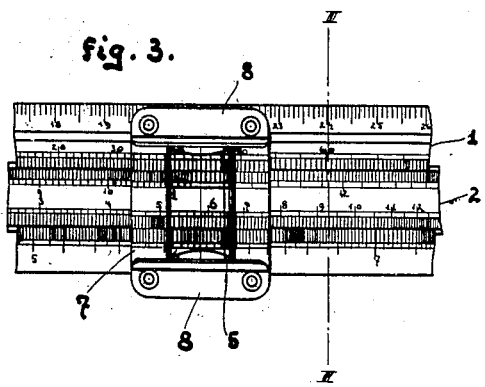
Figure 4:
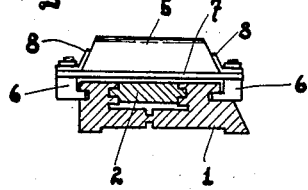

The invention is illustrated by way of example in the accompanying drawing which shows two modifications of the improved slide rule, Figure 1 being an elevation of a portion of a slide rule with a magnifying cursor according to the invention, Figure 2 a section along the line I—I of Figure 1, Figure 3 an elevation of a portion of a slide rule with a modified form of magnifying cursor, and Figure 4 a section through the line III—III of Figure 3.

Referring to the drawings the slide rule shown in Figures 1 and 2, is constructed in the usual manner, that is to say it consists of the slide rule body 1 and the slide 2. On the slide rule body 1 is slidably mounted a cursor 3 of known shape, having a frame and a window covering the frame opening. On each guide strip of the cursor frame is fixed by riveting or otherwise a resilient steel guide rail 4. A semi-cylindrical lens 5 is mounted between the two steel guiding rails 4 so as to be capable of sliding in the longitudinal direction of the rule.

In the second constructional form of the invention shown in Figures 3 and 4, the slide rule is constructed in the same manner as in the case of the first constructional form, that is to say it also consists of the slide rule body 1 and the slide 2. Instead of the frame cursor, however, a frameless cursor allowing an unobstructed view of the part of the slide rule below it is provided, said cursor consisting of two guide strips 6 and a transparent sheet or plate 7 which connects the two guide strips 6 together without any marginal framework. A steel guide rail 8 is riveted, screwed, or otherwise fixed to each of the guide rails 6 with the plate 7 interposed between them. Between the steel guide rails 8 a semi-cylindrical lens 5 slides, in the same manner as in the case of the first constructional form, in the direction of the rule.

In using the slide rule, the slide and cursor are adjusted in the ordinary manner and the lens is then displaced with respect to the cursor in such a manner that the point of the slide rule to be read off lies under the middle of the lens. By this means a certain and exact reading of the slide rule is possible independently, whether the point to be read off lies in the middle or at the sides of the cursor. Of course the cursor can be provided with a number of lines without detrimentally affecting the exactness of the reading off, by means of the magnifying glass, because the latter can be adjusted to any desired position on the cursor.

The construction of the slide rule itself, as well as that of the cursor, may of course take any desired form, as long as the magnifying glass or the lens is slidable with respect to the cursor.

What I claim is:—

1. The combination with a slide rule of a cursor having guide members extending in the direction of the slide rule and a magnifying glass slidably mounted on the cursor between said guide members, for the purposes set forth.

2. The combination with a slide rule of a cursor having guide members for guiding the cursor along the slide rule, sheet metal guiding strips fixed to said guide members and a magnifying glass slidably mounted on said cursor between said guiding strips, for the purposes set forth.

In testimony whereof I have signed my name to this specification.

FRITZ WÖMPNER.